United States Patent Office 3,546,620
Patented Dec. 8, 1970

3,546,620
SCANNING FABRY-PEROT LASER "Q" SWITCH
Allen M. Erickson, Silver Spring, and Bernard V. Kessler, Greenbelt, Md., assignors to the United States of America as represented by the Secretary of the Navy
Filed Jan. 26, 1967, Ser. No. 612,301
Int. Cl. H01s 3/11
U.S. Cl. 331—94.5           3 Claims

ABSTRACT OF THE DISCLOSURE

Apparatus for Q-switching a laser which operates on the scanning Fabry-Perot principle to effect laser switching. The switching action is accomplished electrically for demand synchronization with external events. When the laser rod is pumped beyond threshold, lasing action is held off due to the transmission-reflection characteristics of the scanning Fabry-Perot "Q" switch. Q-switching is accomplished at the appropriate moment by moving one of the dielectric mirrors with respect to the other to change the transmission-reflection characteristics of the scanning Fabry-Perot optical cavity thereby permitting lasing action to occur. This movement is produced by a piezoelectric crystal which acts on the dielectric mirror pair in response to a voltage pulse from a pulse generator.

BACKGROUND OF THE INVENTION

This invention relates generally to Q-switching a solid-state laser, and more particularly to a scanning Fabry-Perot laser Q-switching device.

In the field of lasers, it has been the general practice to employ a Kerr cell, a motor driven prism, or a bleachable dye to Q-switch a solid-state laser. Although such devices have served the purpose for some applications, they have disadvantages. The Kerr cell, or pockel cell, system introduces high losses in the resonant cavity. The motor driven prism can not be synchronized with an outside event and is subject to double pulsing due to its slow switching rate. The bleachable dye is subject to switching jitter and has no means of close synchronization with an outside event.

SUMMARY OF THE INVENTION

It is therefore an object of the instant invention to provide a Q-switching device for a solid-state laser which has a low cavity insertion loss and is readily synchronized with an outside event.

It is another object of this invention to provide a device for Q-switching a laser on command which is rapid enough to insure single pulse laser operation.

According to the present invention, the foregoing and other objects are attained by providing within a laser Fabry-Perot cavity a pair of closely spaced, parallel dielectric mirrors which form a second Fabry-Perot cavity. In one embodiment of the invention, the pair of mirrors function as a single reflector and together with a third mirror form the laser Fabry-Perot cavity. Normally, the pair of mirrors are spaced to produce minimum reflection. Q-switching is accomplished by utilizing a piezoelectric crystal to move one of the mirrors with respect to the other. Expansion of the ceramic crystal scans the Fabry-Perot reflection of the pair of mirrors from minimum to maximum thereby switching the laser Fabry-Perot cavity to a high reflectance that permits lasing action.

In an alternate embodiment of the invention, the pair of mirrors are disposed in front of one of two mirrors that form the laser Fabry-Perot cavity and slightly canted with respect thereto. In this case, the pair of mirrors function as an optical shutter since they are normally spaced to produce maximum reflection and hence minimum transmission. Any light produced along the axis of the laser rod is reflected off-axis by the pair of mirrors thereby preventing lasing action. Q-switching is again accomplished by utilizing a piezoelectric crystal to move one of the mirrors with respect to the other. In this case, expansion of the crystal scans the Fabry-Perot reflection of the pair of mirrors from maximum to minimum. The transmission of the pair of mirrors then becomes maximum thereby permitting light to be reflected from the mirror behind the pair of mirrors and permitting lasing action.

BRIEF DESCRIPTION OF THE DRAWING

The specific nature of the invention, as well as other objects, aspects, uses and advantages thereof, will clearly appear from the following description and from the accompanying drawing, in which.

DESCRIPTION OF THE PREFERRED EMBODIMENTS

Figure 1:
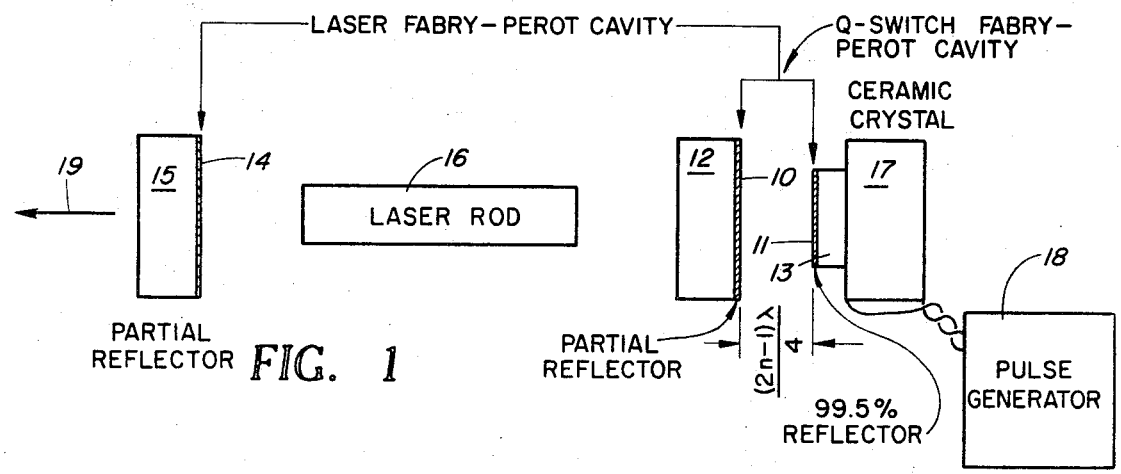
FIG. 1 is a block diagram of a first embodiment of the invention wherein the scanning Fabry-Perot "Q" switch functions as one mirror of the laser Fabry-Perot cavity.

Referring now to the drawing wherein like reference numerals designate identical or corresponding parts throughout the several views, the first embodiment as shown in FIG. 1 includes a pair of closely-spaced, parallel dielectric mirrors 10 and 11. Dielectric mirror 10 is a partial reflector, say for example 55%, and is supported by a suitable transparent substrate 12 such as glass. Dielectric mirror 11 is a 99.5% reflector supported by a quartz substrate 13. Mirrors 10 and 11 form the "Q" switch Fabry-Perot cavity. A third dielectric mirror 14 which is a partial reflector and supported on a glass substrate 15 is spaced apart from and parallel to the mirror pair 10 and 11. Mirrors 10 and 11 function as a single reflector and together with mirror 14 comprise the laser Fabry-Perot optical cavity within which is disposed a laser rod 16. Mirrors 10 and 11 are initially adjusted to be an odd multiple of a quarter of a wavelength of the laser light apart to produce minimum reflection. When laser rod 16 is pumped beyond threshold, lasing action is held off due to the minimum reflection adjustment of mirrors 10 and 11. Q-switching action is accomplished at the appropriate moment by moving mirror 11 relative to mirror 10. To do this, there is provided a ceramic piezoelectric crystal 17 upon one face of which is mounted substrate 13. Crystal 17 is connected to pulse generator 18 which may be triggered in any manner well known in the art and synchronized with an outside event as desired. A pulse from pulse generator 18 causes the ceramic crystal 17 to expand and in turn move mirror 11. This scans the Q-switch Fabry-Perot reflection of mirrors 10 and 11 from the minimum to the maximum and in turn switches the laser Fabry-Perot cavity to a high reflectance that permits lasing action, thus Q-switching the laser. Because of the finesse of the Q-switching Fabry-Perot cavity, the mirror spacing need only be changed by a fraction of a quarter wave length of the laser light to switch from a minimum to a maximum reflection state. Arrow 19 indicates the direction of the emitted laser light pulse.

Figure 2:
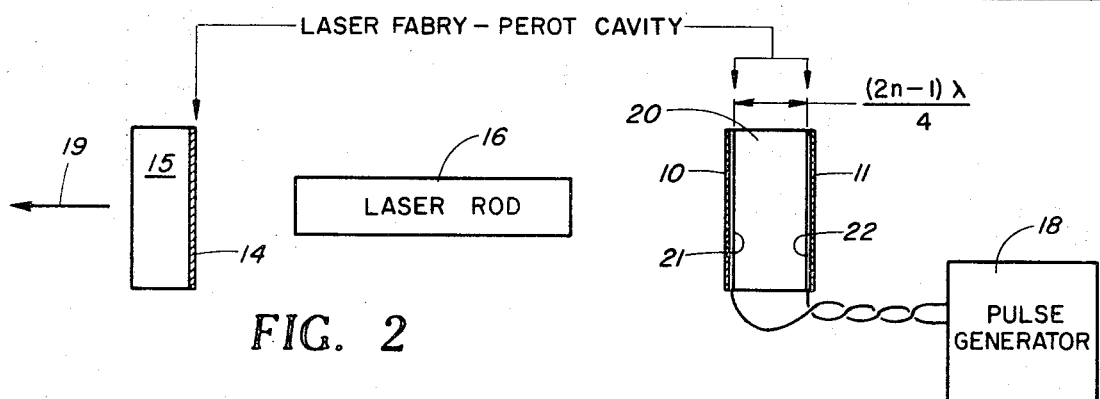
FIG. 2 is a block diagram of the first embodiment of the invention as shown in FIG. 1 illustrating an alternative construction of the scanning Fabry-Perot "Q" switch.

The Q-switch Fabry-Perot cavity may be alternately constructed as shown in FIG. 2. The laser system shown in FIG. 2 is identical with that shown in FIG. 1 except that mirrors 10 and 11 are supported on opposite faces of an X-cut quartz crystal 20 having a optical width equal to an odd multiple of a quarter wave length of the laser light. In the actual construction of the Q-switch Fabry-Perot cavity, the opposite faces of crystal 20 are coated with a transparent conductive coating 21 and 22 to provide electrical contact for connection to pulse generator 18. Dielectric mirrors 10 and 11 are then deposited over coatings 21 and 22, respectively. When crystal 20 expands, both mirrors 10 and 11 will move relative to one another thereby scanning the Q-switch Fabry-Perot reflection from the minimum to the maximum.

Figure 3:
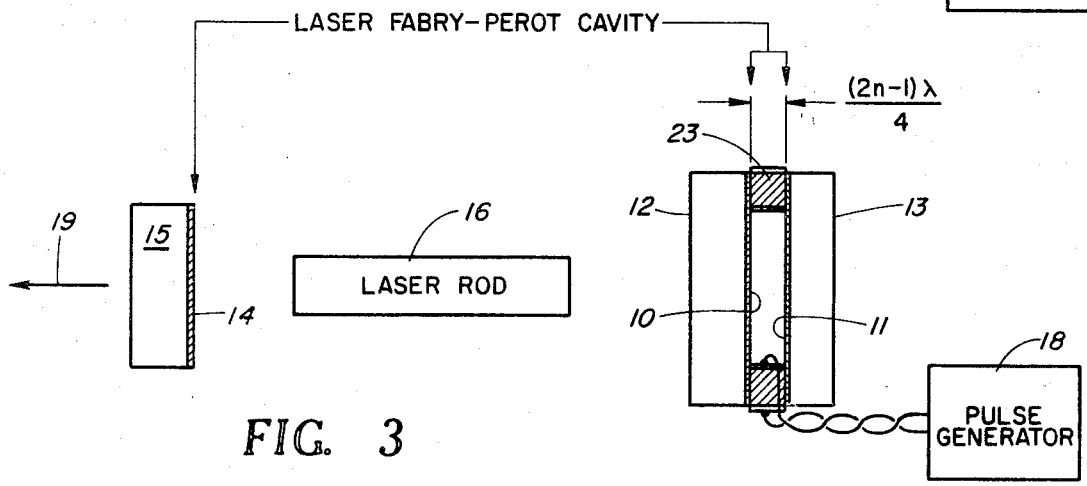
FIG. 3 is a block diagram of the first embodiment of the invention shown in FIG. 1 illustrating another alternate construction of the scanning Fabry-Perot "Q" switch.

Another alternate construction for the Q-switch Fabry-Perot cavity of the laser system shown in FIG. 1 is shown in FIG. 3. In this case, mirrors 10 and 11 are supported by substrates 12 and 13, as before, but are spaced apart by a ring piezoelectric element 23 which is cut to a thickness of an odd multiple of a quarter wave length of the laser light. Element 23 may be made of barium titanate or quartz and has electrodes deposited about its interior and exterior surfaces to facilitate connection to pulse generator 18. Operation is the same as in FIG. 2 with both mirrors 10 and 11 moving relative to one another when element 23 is pulsed, but fabrication is simplified.

Figure 4:
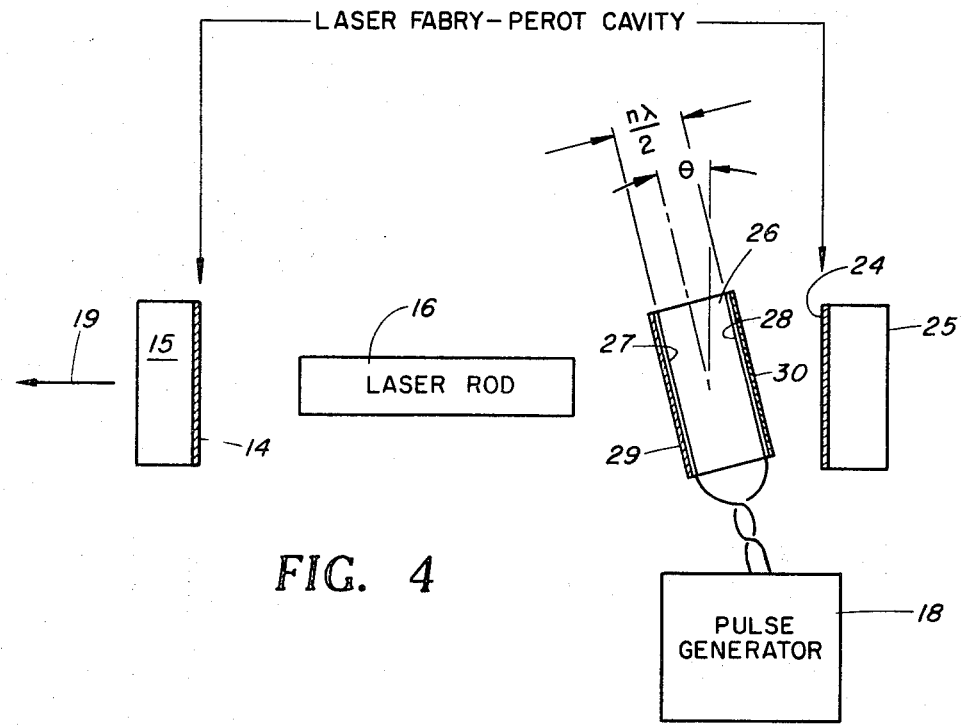
FIG. 4 is a block diagram of a second embodiment of the invention wherein the scanning Fabry-Perot "Q" switch functions as an optical shutter; and, FIG. 5 is a block diagram of the second embodiment of the invention shown in FIG. 4 illustrating an alternate construction of the scanning Fabry-Perot "Q" switch.

In the embodiment shown in FIG. 4, the Q-switch Fabry-Perot cavity is used as a shutter to inhibit light reflection in the laser Fabry-Perot cavity. Specifically, the laser Fabry-Perot cavity is defined by dielectric mirrors 14 and 24. Mirror 24 is a 99.5% reflecting dielectric mirror supported on a glass substrate 25. The Q-switch Fabry-Perot cavity is positioned just in front of mirror 24 and comprises an X-cut quartz crystal 26 having an optical width equal to a multiple of a half wave length of the laser light. The opposite faces of crystal 26 are coated with a transparent conductive coating 27 and 28 to provide electrical contact for connection to pulse generator 18. Partially reflecting dielectric mirrors 29 and 30 are deposited over coatings 21 and 22, respectively. As indicated in the drawing, the Q-switch Fabry-Perot cavity is canted by an angle $\theta$ with respect to the laser Fabry-Perot cavity. It is to be understood that for purpose of illustration the angle $\theta$ is greatly exaggerated and in actual practice is quite small. Since mirrors 29 and 30 are optically separated by a multiple of a half wave lenght of the laser light, they produce maximum reflection thereby blocking mirror 24 and deflecting light in the laser cavtiy off-axis. This condition inhibits lasing action when laser rod 16 is pumped beyond threshold.

Q-switching action is accomplished at the appropriate moment by pulsing crystal 26. This causes crystal 26 to expand resulting in the movement of mirrors 29 and 30 relative to one another thus scanning the Q-switch Fabry-Perot reflection from a maximum to a minimum. Transmission then becomes maximum, and light is reflected from mirror 24 permitting lasing action.

Figure 5:
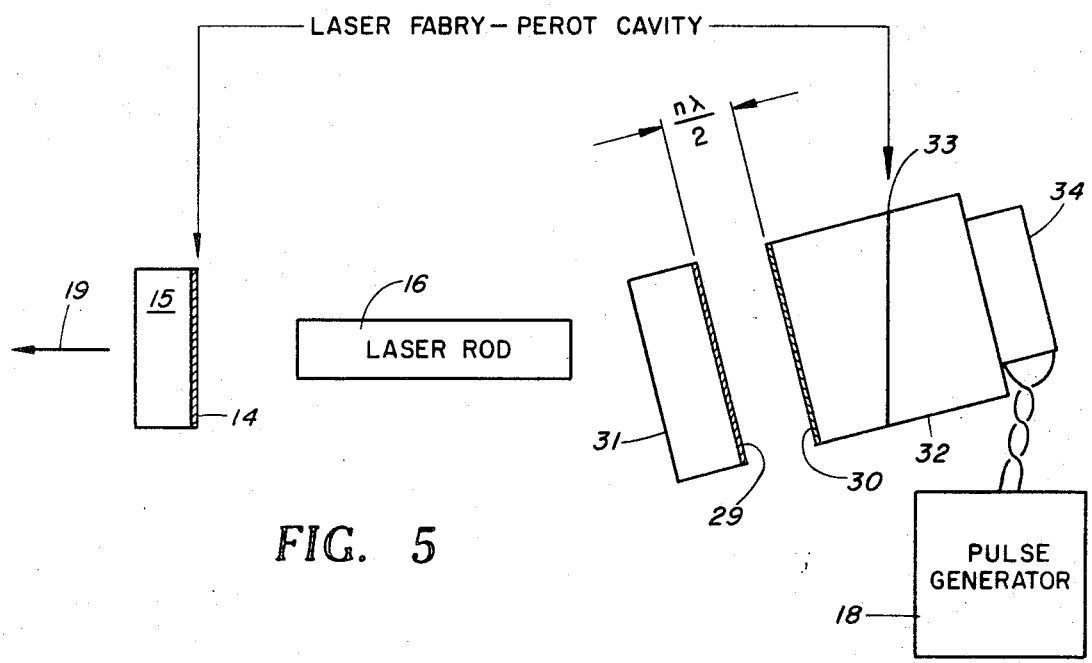

An alternative construction of the Q-switch Fabry-Perot cavity for the system of FIG. 4 is shown in FIG. 5. The Q-switch Fabry-Perot cavity comprises dielectric mirrors 29 and 30, as before. Mirror 29 is supported by a glass substrate 31 and separated from mirror 30 by a multiple of a half wave length of laser light. Mirror 30 is supported by a block of fused quartz 32 which has been sliced off-axis and cemented together with a 99.5% reflecting dielectric coating 33 sandwiched between. The dielectric coating or mirror 33 and mirror 14 define the laser Fabry-Perot cavity. A ceramic piezoelectric crystal 34 is mounted on the back of the quartz block 32 and electrically connected to pulse generator 18. When pulsed by generator 18, crystal 34 generates an acoustic wave which travels through quartz block 32 and causes mirror 30 to move relative to mirror 29. This scans the Q-switch Fabry-Perot cavity from maximum reflection to minimum reflection. Light is then reflected from mirror 33 permitting lasing action to occur. Since the embodiments of FIGS. 4 and 5 are initially in the maximum reflectance mode, they are less sensitive to external vibrations.

Obviosuly many modifications and variations of the present invention are possible in the light of the above teachings.

What is claimed and desired to be secured by Letters Patent of the United States is:

1. In a solid-state laser system comprising a laser rod positioned within a Fabry-Perot cavity, a scanning Fabry-Perot "Q" switch comprising:
   a pair of closely spaced, parallel dielectric mirrors forming a second Fabry-Perot cavity positioned within the laser Fabry-Perot cavity, said second Fabry-Perot cavity normally having a transmission-reflection characteristic which inhibits lasing action when the laser rod is pumped beyond threshold,
   a piezoelectric crystal positioned to act on one of said parallel dielectric mirrors; and
   a pulse generator for producing a voltage pulse, to effect rapid expansion of said piezoelectric crystal which rapid expansion effects rapid movement of said mirror to produce single pulse laser operation.

2. A scanning Fabry-Perot "Q" switch as recited in claim 1 wherein said pair of mirrors function as a single reflector which is one of the reflectors that defines the laser Fabry-Perot cavity, said pair of mirrors normally being spaced an odd multiple of a quarter wave length of the laser light to produce minimum reflection, expansion of said piezoelectric crystal producing a scanning of the Fabry-Perot reflection of, said pair of mirrors from a minimum to a maximum thereby switching the laser Fabry-Perot cavity to a high reflectance that permits single pulse lasting action.

3. A scanning Fabry-Perot "Q" switch as recited in claim 1 wherein said pair of mirrors is disposed in front of one of the reflectors that defines the laser Fabry-Perot cavity and slightly canted with respect thereto, said pair of mirrors normally being spaced a multiple of a half wave length of the laser light to produce maximum reflection and hence minimum transmission thereby causing any light produced along the axis of the laser rod to be reflected off-axis and inhibiting lasing action, expansion of said piezoelectric crystal producing a scanning of the Fabry-Perot reflection of said pair of mirrors from a maximum to a minimum and hence producing maximum transmission thereby permitting light to be reflected in the laser Fabry-Perot cavity and single pulse lasing action.

References Cited

UNITED STATES PATENTS

| 3,339,073 | 8/1967 | Hunter | 250—199 |
| 3,388,314 | 6/1968 | Gould | 321—69 |
| 3,422,370 | 1/1969 | Collins | 331—94.5 |

OTHER REFERENCES

Peterson et al.: "Interferometry and Laser Control With Solid Fabry-Perot Etalons," Applied Optics vol. 5, pp. 985–91, June 1966.

RONALD L. WIBERT, Primary Examiner

E. BAUER, Assistant Examiner

U.S. Cl. X.R.

350—160, 163, 285